(12) United States Patent
Ooi et al.

(10) Patent No.: US 7,336,870 B2
(45) Date of Patent: Feb. 26, 2008

(54) OPTICAL TRANSMISSION SYSTEM

(75) Inventors: Hiroki Ooi, Kawasaki (JP); Akira Miura, Kawasaki (JP); Takafumi Terahara, Kawasaki (JP); Ichiro Nakajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/362,704

(22) Filed: Feb. 28, 2006

(65) Prior Publication Data

US 2006/0193554 A1 Aug. 31, 2006

(30) Foreign Application Priority Data

Feb. 28, 2005 (JP) .............................. 2005-055213

(51) Int. Cl.
*G02B 6/28* (2006.01)

(52) U.S. Cl. ........................................ 385/24; 398/147
(58) Field of Classification Search ................ 385/24; 398/147

See application file for complete search history.

(56) References Cited

U.S. PATENT DOCUMENTS 6,433,923 B2   8/2002 Tanaka et al. .............. 359/337
2003/0219198 A1*  11/2003 Zhou ........................... 385/24

FOREIGN PATENT DOCUMENTS

JP   11-331074   11/1999

\* cited by examiner

*Primary Examiner*—Sarah Song
(74) *Attorney, Agent, or Firm*—Staas & Halsey LLP

(57) ABSTRACT

An optical transmission system includes a first/second node with a first/second dispersion compensator that performs a first/second dispersion compensation on an optical signal; and a third node that is arranged between the first/second nodes. The amounts of the first/second dispersion compensations are determined so that a cumulative dispersion of the optical signal after the second dispersion compensation is within a predetermined range.

8 Claims, 14 Drawing Sheets

OPTICAL TRANSMISSION SYSTEM

CROSS-REFERENCE TO RELATED APPLICATIONS

This application is based upon and claims the benefit of priority from the prior Japanese Patent Application No. 2005-055213, filed on Feb. 28, 2005, the entire contents of which are incorporated herein by reference.

BACKGROUND OF THE INVENTION

1. Field of the Invention

The present invention relates to a technology for keeping a cumulative dispersion of an optical signal transmitted through an optical transmission system, which includes a plurality of optical add/drop multiplexers (OADMs) with dispersion compensators, within a predetermined range.

2. Description of the Related Art

Recently, an optical transmission system having 10 Gbit/s (10 gigabits) as a bit rate is progressively commercialized in the optical communication field. However, there is still a strong demand from users for the provision of a conventional low-cost 2.4 Gbit/s (2.4 gigabits) optical transmission apparatus.

A technique of an error correction code of an optical signal (a forward error correction (FEC) technique) is not conventionally used in the 2.4 gigabit optical transmission system. Therefore, a transmission distance of an optical signal based on an optical signal-to-noise ratio (SNR) is limited to about 600 kilometers. Regarding optical signals used in the 2.4 gigabit optical transmission system, residual dispersion tolerance that expresses a permissible range of dispersion of the optical signals is as large as about 10,000 ps/nm. At the maximum transmission distance of about 600 kilometers, cumulative dispersion does not exceed the residual dispersion tolerance. Consequently, it is not necessary to compensate for dispersion of the optical signals. In other words, the transmission distance of the 2.4 gigabit optical transmission system is limited by the optical SNR, and is not limited by the chromatic dispersion.

On the other hand, in the 10 gigabit optical transmission system, chromatic dispersion occurs in excess of the residual dispersion tolerance at the maximum transmission distance of optical signals based on the optical SNR. Therefore, dispersion compensation is necessary for the optical signals. A method of uniformly compensating for dispersion is available by adopting dispersion compensators, at each repeater (for example, see Japanese Patent Application Laid-Open No. H11-331074).

FIG. 13 is an explanatory diagram of a configuration of a system that compensates for chromatic dispersion in the conventional 10 gigabit optical transmission system. In the optical transmission system shown in FIG. 13, a regeneration repeater (REG) 1201 is disposed on a transmission path 100. Each time an optical signal is input to the REG 1201, the REG 1201 converts the optical signal into an electric signal, thereby correcting a collapse of a waveform due to noise and dispersion. The REG 1201 converts the electric signal obtained by the conversion from the optical signal into an optical signal again, and transmits this optical signal to the transmission path 100.

Plural optical add/drop multiplexers (OADM) 1202 are provided as nodes on the transmission path 100. Each OADM 1202 drops an optical signal from the transmission path 100, and externally adds an optical signal to the transmission path 100. The OADM 1202 includes a dispersion compensation fiber (DCF) 1203 as a dispersion compensator, and can compensates for dispersion of optical signals.

FIG. 14 depicts a relationship between dispersion compensation and residual dispersion tolerance in the optical transmission system shown in FIG. 13. In FIG. 14, the vertical axis represents cumulative dispersion D [ps/nm], and the horizontal axis represents the number of spans. The number of spans means the number of transmission path fibers between the nodes counted from a starting point. Nodes include repeaters such as linear repeaters and OADMs. In the examples shown in FIG. 13 and FIG. 14, the nodes are the OADMs 1202 on the transmission path 100 from a point R1 to a point R2.

In FIG. 14, a solid line N in a sawtooth shape represents cumulative dispersion of optical signals at each transmission position. A shaded part represents residual dispersion tolerance T that expresses a permissible range of dispersion of optical signals. With a shortest transmission distance, the residual dispersion tolerance T is about 1,000 ps/nm. When optical signals that are input to the regeneration repeater 1201 or each OADM 1202 are not within the range of residual dispersion tolerance T, these optical signals are not recognized or are received as error signals. It is desirable that all optical signals are within the range of the residual dispersion tolerance T in the whole transmission sector. Particularly, all optical signals are desirably within an optimum range of residual dispersion at R2. To achieve this, the DCF 1203 shown in FIG. 13 compensates for dispersion for each span. At each of 1, 2, ..., m−1, and m that represent the numbers of spans on the horizontal axis, a vertical solid line represents dispersion compensation in each node. These vertical solid lines indicate that cumulative dispersion changes in each node.

However, recently, the FEC technique is also introduced in the 2.4 gigabit system. Since a maximum transmission distance of optical signals limited by the optical signal-to-noise ratio increases based on the FEC technique, dispersion compensation becomes necessary. In other words, the cumulative dispersion of optical signals that are transmitted to the maximum transmission distance exceeds the residual dispersion tolerance. Consequently, dispersion compensation of the optical signals becomes necessary.

FIG. 15 is an explanatory diagram of the conventional 2.4 gigabit optical transmission system. FIG. 16 is an explanatory diagram of a method of compensating for chromatic dispersion in the conventional 2.4 gigabit optical transmission system. In the 2.4 gigabit optical transmission system shown in FIG. 15, dispersion compensation is not carried out. In the 2.4 gigabit optical transmission system shown in FIG. 16, dispersion compensation is carried out using the DCF 1203. In FIG. 15 and FIG. 16, like reference numerals designate like constituent elements as those shown in FIG. 13, and therefore, redundant explanation is omitted.

FIG. 17 depicts a relationship between dispersion compensation and residual dispersion tolerance in the optical transmission system shown in FIG. 15 and FIG. 16. In FIG. 17, the vertical axis represents cumulative dispersion D [ps/nm], and the horizontal axis represents the number of spans. A solid line N1 at an upper part of the diagram expresses dispersion of optical signals in FIG. 15, and a solid line N2 in a sawtooth shape at a lower part expresses dispersion of optical signals shown in FIG. 16. Residual dispersion tolerance T shown by hatched lines becomes about 16,000 ps/nm, and this width is 16 times that of the 10 gigabit optical transmission system.

Regarding the cumulative dispersion N1 shown in FIG. 17 where dispersion compensation based on the configuration shown in FIG. 14 is not carried out, the cumulative dispersion exceeds the residual dispersion tolerance T when the distance increases from R2 to R2'. In this case, the DCF 1203 is disposed in all the OADMs 1202 in all nodes as shown in FIG. 16, thereby reducing the cumulative dispersion N2. However, compensation carried out by each DCF 1203 is set to a small level. Cost of the optical transmission system depends on the number of disposed DCFs 1203. Therefore, the dispersion compensation method of disposing the DCFs 12 in all the OADMs 1202 in all nodes as shown in FIG. 16 increases cost.

According to the technique disclosed in Japanese Patent Application Laid-Open No. H11-331074, dispersion compensation is carried out in a point-to-point transmission, by having one transmission end and one reception end fixed for optical signals. Recently, multiple functions of nodes (relay points) are required in the optical transmission system. Optical signals are added or dropped at any position on the transmission path such as an OADM, a wavelength cross connect (an optical hub). Therefore, even when an optical signal is added from any node or dropped from any node, cumulative dispersion needs to be accommodated within residual dispersion tolerance.

SUMMARY OF THE INVENTION

It is an object of the present invention to at least solve the problems in the conventional technology.

An optical transmission system according to an aspect of the present invention includes a plurality of nodes each of which adds/drops an optical signal to/from a transmission path. The nodes include: a first node that includes a first dispersion compensator that performs a first dispersion compensation on the optical signal; a second node that is arranged downstream of the first node and includes a second dispersion compensator that performs a second dispersion compensation on the optical signal; and a third node that is arranged between the first node and the second node. An amount of the first dispersion compensation and an amount of the second dispersion compensation are determined so that a cumulative dispersion of the optical signal after the second dispersion compensation is within a predetermined range.

An optical add/drop multiplexer (OADM) in an optical transmission system according to another aspect of the present invention includes a dispersion compensator that performs a dispersion compensation on an optical signal from any one of a first optical add/drop multiplexer (OADM) with a dispersion compensator and a second optical add/drop multiplexer (OADM) without a dispersion compensator. An amount of the dispersion compensation is determined so that a cumulative dispersion of the optical signal after the dispersion compensation is within a predetermined range.

A dispersion compensation method according to still another aspect of the present invention is for an optical add/drop multiplexer (OADM) in an optical transmission system. The OADM includes a dispersion compensator that performs a dispersion compensation on an optical signal from any one of a first optical add/drop multiplexer (OADM) with a dispersion compensator and a second optical add/drop multiplexer (OADM) without a dispersion compensator. An amount of the dispersion compensation is determined so that a cumulative dispersion of the optical signal after the dispersion compensation is within a predetermined range.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments of the present invention will be explained in detail below with reference to the accompanying drawings.

Figure 1:
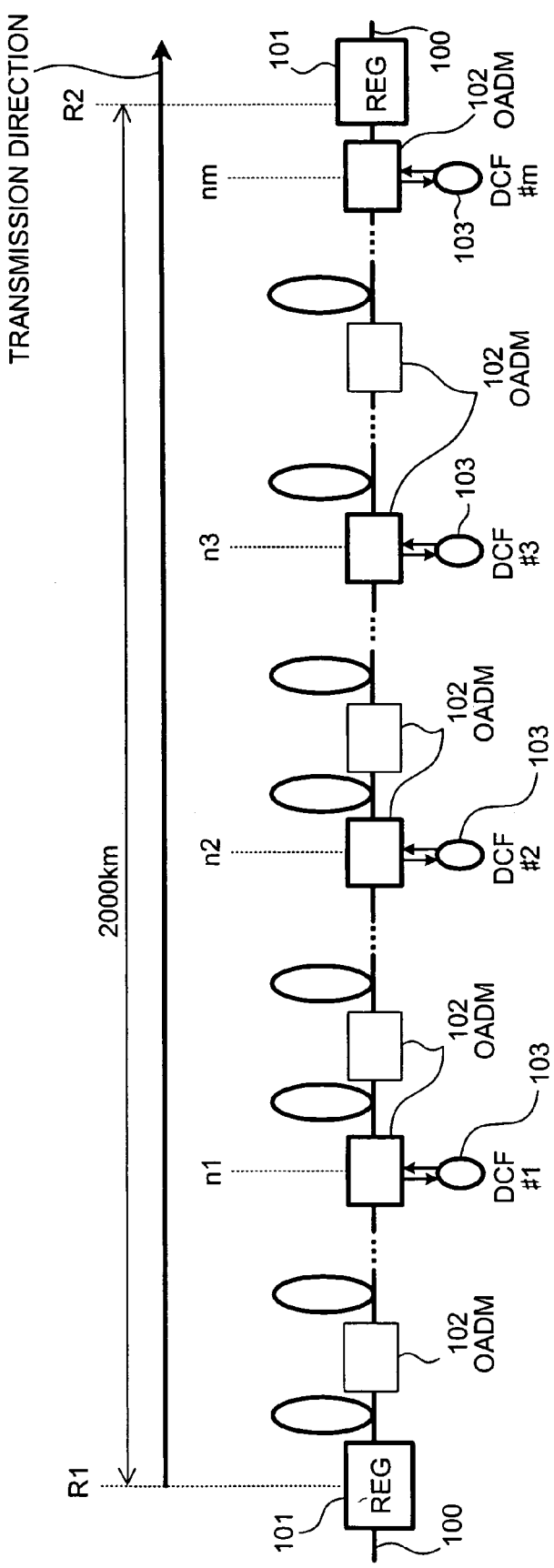
FIG. 1 is an explanatory diagram of a configuration of a chromatic dispersion compensation system according to the present invention.

FIG. 1 is an explanatory diagram of a configuration of a chromatic dispersion compensation system according to the present invention. The chromatic dispersion compensation system includes a pair of regeneration repeaters (REGs) 101, and plural optical add/drop multiplexers (OADMs) 102 disposed as node between these REGs 101, on the transmission path 100. According to the present invention, dispersion compensation fibers (DCFs) 103 are cyclically fitted (at every predetermined node) in the OADMs 102.

The transmission path 100 is an optical fiber through which optical signals multiplexed with specific wavelength bands are transmitted. The REG 101 is disposed at each equal interval, for example, at every 2,000 kilometers, on the transmission path 100 as shown in FIG. 1. This is a maximum transmission distance in which optical signals can be recognized without error, because waveforms of optical signals collapse due to a noise signal in proportion to a transmission distance of the transmission path 100. The REG 101 converts an input optical signal into an electric signal, and generates an optical signal again from the converted electric signal, thereby shaping the waveforms, and outputting the waveform-shaped optical signal to the transmission path 100. Plural OADMs 102 are provided as nodes that drop and add optical signals, between the two REGs 101, that is, between R1 and R2.

Figure 2:
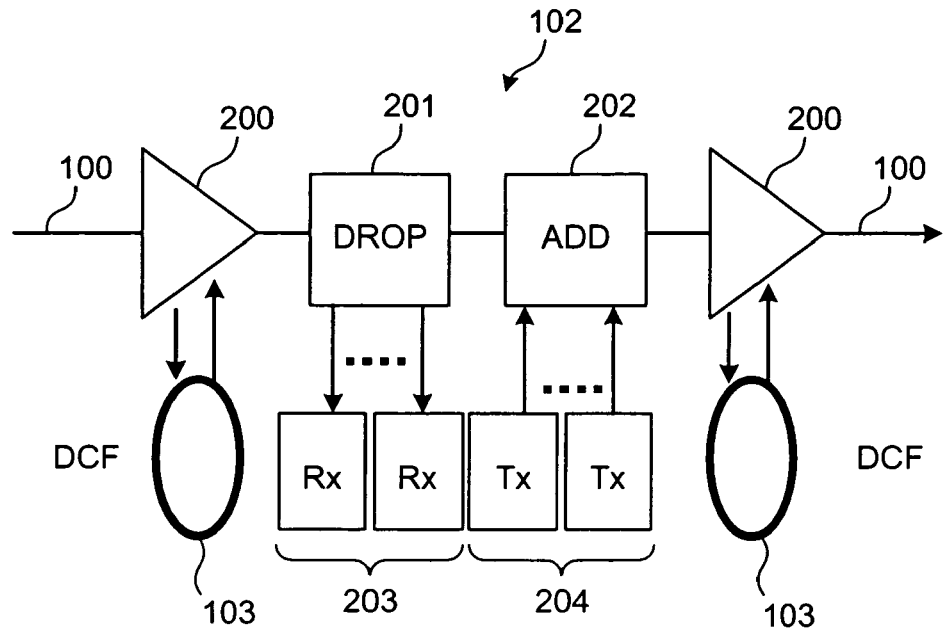
FIG. 2 is an explanatory diagram of a configuration of an optical add/drop multiplexer (OADM) fitted with dispersion compensation fibers (DCF)

FIG. 2 is an explanatory diagram of a configuration example of an OADM fitted with the DCF. As shown in FIG. 2, the OADM 102 includes two optical amplifiers 200 and 200 that are disposed at an input side and an output side respectively of the transmission path 100, and a dropping device 201 and an adding device 202 that are disposed respectively between the optical amplifiers 200 and 200. The DCF 103 is fitted to each optical amplifier 200. A receiver (Rx) 203 is fitted for each wavelength of an optical signal, in the dropping device 201. Similarly, a transmitter (Tx) 204 is fitted for each wavelength of the optical signal, in the adding device 202. The DCF 103 compensates for dispersion of optical signals transmitted on the transmission path 100, each time when the optical signals pass through the optical amplifier 200.

Figure 3:
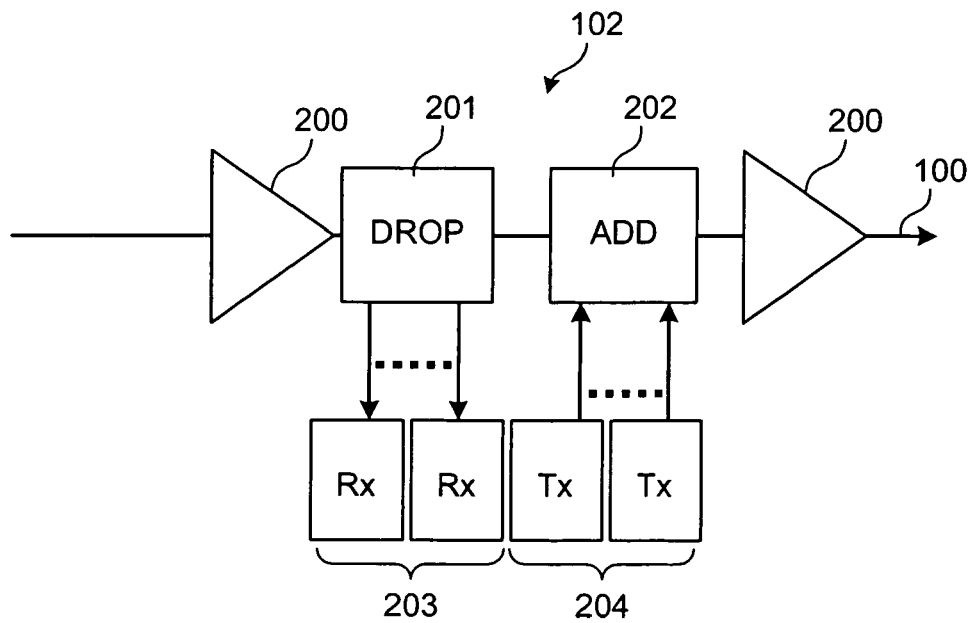
FIG. 3 is an explanatory diagram of a configuration of an optical add/drop multiplexer (OADM) fitted with dispersion compensation fibers (DCF)

FIG. 3 is an explanatory diagram of a configuration example of the OADM not fitted with the DCFs. As shown in FIG. 3, the OADM 102 includes the two optical amplifiers 200 and 200 that are disposed at an input side and an output side respectively of the transmission path 100, and the dropping device 201 and the adding device 202 that are disposed respectively between the optical amplifiers 200 and 200. The receiver (Rx) 203 is fitted for each wavelength of an optical signal, in the dropping device 201. Similarly, the transmitter (Tx) 204 is fitted for each wavelength of the optical signal, in the adding device 202. In the above chromatic dispersion compensation system, the following method of compensating for chromatic dispersion is used to carry out optimum dispersion compensation.

Figure 4:
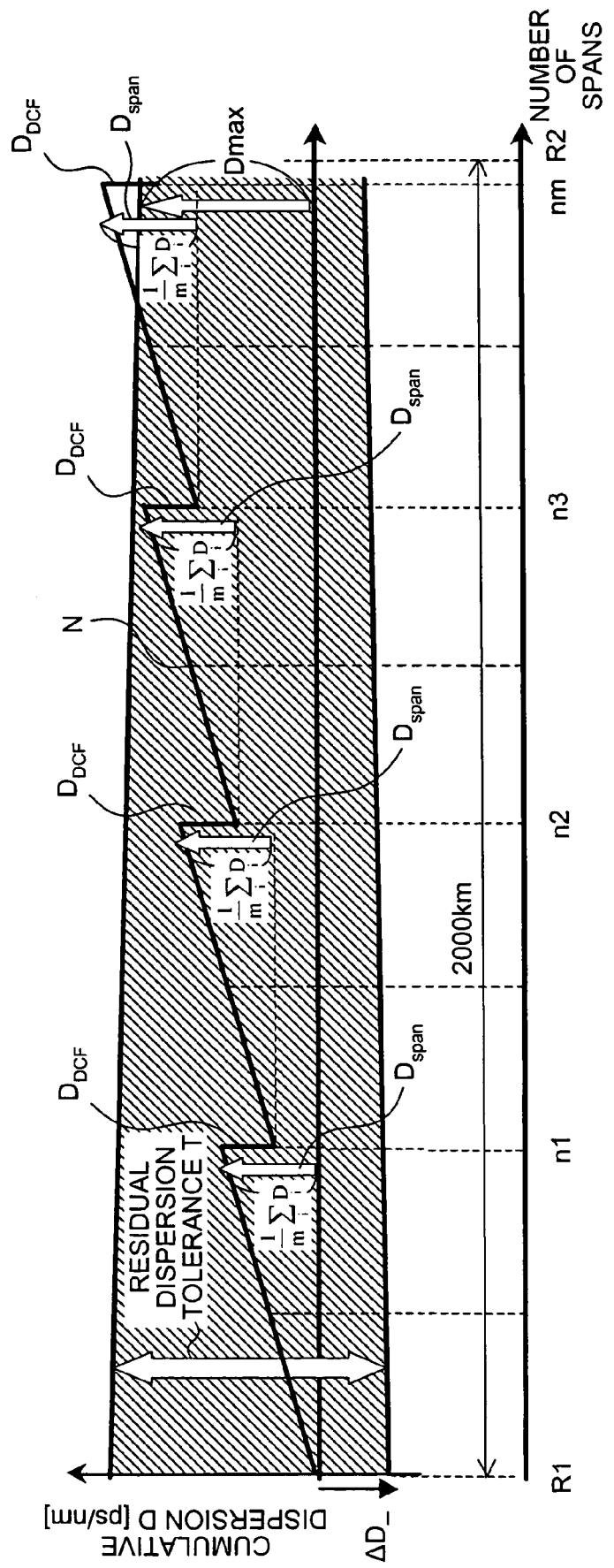
FIG. 4 is a graph of a relationship between dispersion compensation and residual dispersion tolerance in the chromatic dispersion compensation system shown in FIG. 1.

FIG. 4 is a graph of a relationship between dispersion compensation and residual dispersion tolerance in the chromatic dispersion compensation system shown in FIG. 1. In FIG. 4, the vertical axis represents cumulative dispersion D [ps/nm], and the horizontal axis represents the number of spans. A solid line N in a sawtooth shape expresses cumulative dispersion of optical signals, and a shaded part expresses residual dispersion tolerance. Values shown on the horizontal axis correspond to those shown in FIG. 1. R1 and R2 represent positions of the REG 101. #1 to #m express positions of the DCFs 103.

As shown in FIG. 4, cumulative dispersion D of optical signals output from the REG 101 at R1 increases by Dspan corresponding to the number of spans. Dispersion compensation DDCF is carried out to the optical signals at n1 to nm as nodes of chromatic dispersion in FIG. 4. As shown by the node nm, even when the cumulative dispersion D of optical signals input to the node nm exceeds the residual dispersion tolerance, the DCF 103 in the node nm compensates for dispersion, and the cumulative dispersion D is within the residual dispersion tolerance at R2.

To dispose the OADM 102 (see FIG. 1) that is fitted with the DCF 103 so as to accommodate the cumulative dispersion D of the optical signals within the range of the residual dispersion tolerance as shown in FIG. 4, the following items 1 to 3 are taken into account.

1. A cyclic dispersion map is used. Specifically, the DCF 103 is disposed at equal intervals such as at every one span or every two spans.
2. Dispersion compensators are disposed integrally. Specifically, a level of compensation carried out by the DCFs 103 that are cyclically disposed is set as high as possible. With this arrangement, the number of dispositions of the DCFs 103 can be minimized.
3. Cumulative dispersion of optical signals is accommodated within the range of dispersion compensation tolerance, for all routes of optical signals, that is, for all patterns of adding and dropping of optical signals. This is a constraint to the above items 1 and 2.

It is assumed herein that: m represents the necessary number of DCFs 103; i represents the number of spans from R1; Dmax represents an upper limit of the residual dispersion tolerance T at R2; $\Delta D_-$ represents a lower limit of the residual dispersion tolerance T of optical signals at R1; and DDCF represents compensation in each DCF 103. From the condition shown in the following expression (1), a minimum required number of the DCFs 103 in the section from R1 to R2 (2,000 kilometers) can be determined.

$$m \geq \frac{\sum_i D_i - D_{max}}{-\Delta D}. \tag{1}$$

However, while the compensation DDCF is the compensation in each DCF 103 based on the integrated disposition of dispersion compensators described in the item 2 above, it is set as $\Delta D_-$ in the above expression (1). The following three items are limiting factors for determining the upper limit of the compensation DDCF. A smallest value among these three items is set as compensation.

Item 1: Secured transmission characteristic of a signal that is dropped in the OADM having a DCF after transmitting during only one span;
Item 2: Residual dispersion tolerance during a maximum span; and
Item 3: Permissible dispersion compensation fiber loss of the optical amplifier.

The above items are explained below in order.

Figure 5:
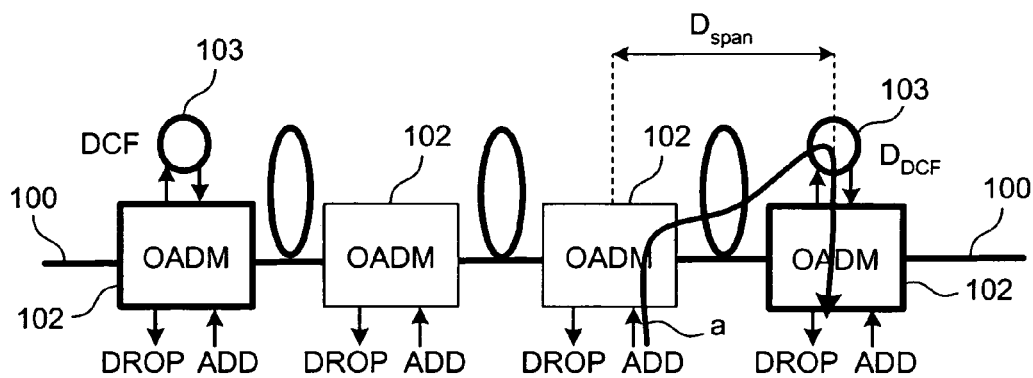
FIG. 5 is an explanatory diagram of an example of an optical signal added and dropped by the OADMs fitted with the DCFs after transmitting the optical signal during one span.
Figure 6:
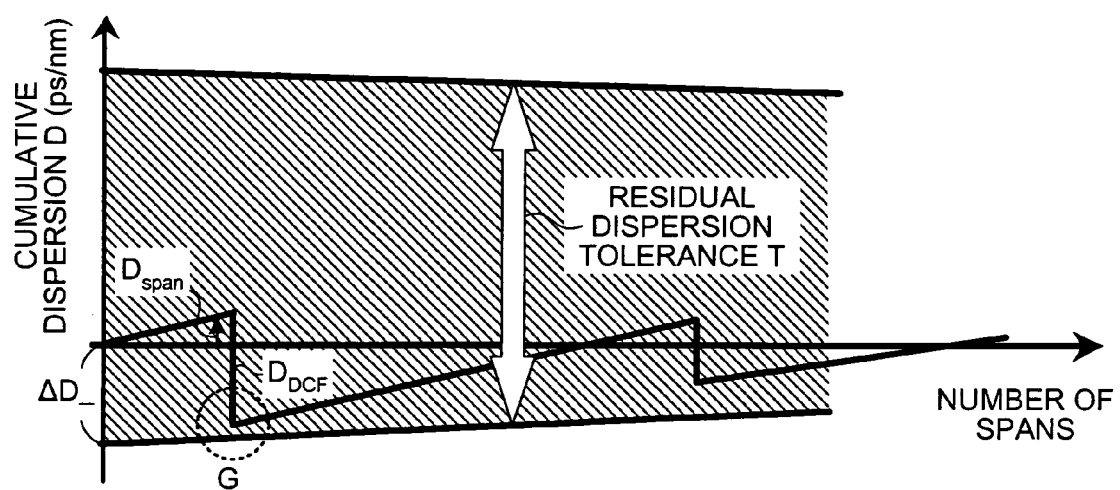
FIG. 6 is a graph of a relationship between cumulative dispersion and residual dispersion tolerance in the example of optical signals shown in FIG. 5.

FIG. 5 is an explanatory diagram of an example of an optical signal added and dropped by the OADMs fitted with the DCFs after transmitting the optical signal during one span. FIG. 6 is a graph of a relationship between cumulative dispersion and residual dispersion tolerance in the example of optical signals shown in FIG. 5. The item 1 is explained first. In FIG. 6, the vertical axis represents cumulative dispersion D [ps/nm], and the horizontal axis represents the number of spans. A shaded part represents the residual dispersion tolerance T.

As shown by a path a shown in FIG. 5, when the OADM 102 drops an optical signal immediately after the adjacent OADM 102 inputs this optical signal, the chromatic dispersion of the optical signal occurs in only the section shown by Dspan. In this case, a cumulative dispersion position G of the optical signals that are dispersion compensated by the compensation DDCF after the Dspan dispersion shown in FIG. 6 needs to be set not lower than the residual dispersion tolerance T. Therefore, the compensation DDCF is limited by the following expression (2).

$$D_{DCF} \geq \Delta D_- - D_{span} \quad (2)$$

In this case, a minimum value during the total spans is used for the dispersion Dspan. Therefore, when an optical signal is dropped during a very short span, the value of Dspan is substantially zero, and the expression (2) is approximated to DDCF=□D_.

Figure 7:
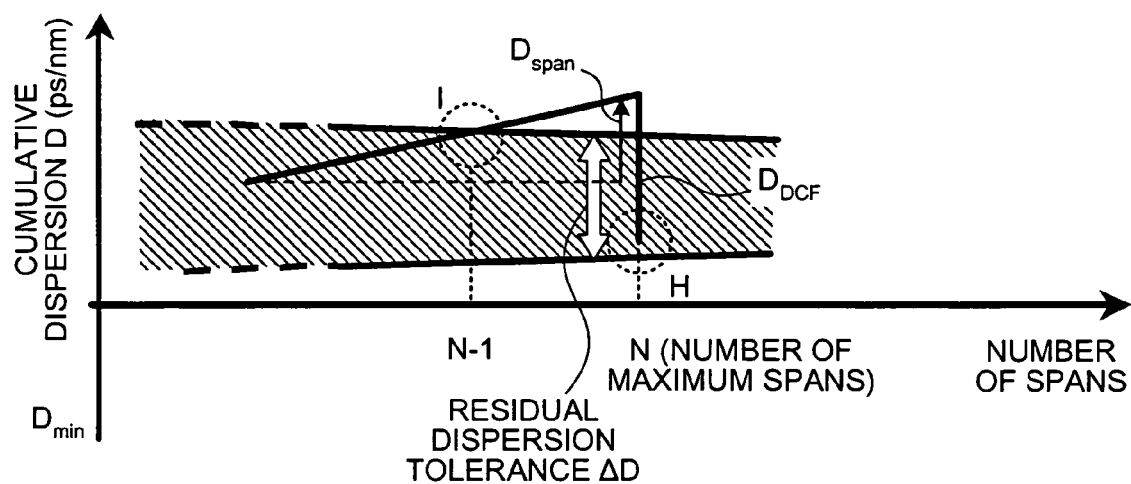
FIG. 7 is a graph of a setting of residual dispersion tolerance during a maximum span.

FIG. 7 is a graph of a setting of residual dispersion tolerance during a maximum span. The item 2 is explained with reference to FIG. 7. In FIG. 7, the vertical axis represents cumulative dispersion D [ps/nm], and the horizontal axis represents the number of spans. A shaded part represents the residual dispersion tolerance T. The dispersion until when the DCF 103 compensates for the dispersion is expressed as Dspan. The residual dispersion tolerance T during the maximum span should be such that optical signals can be dropped during a maximum span N, that is, both at a point H where dropping is carried out after the disposed DCF 103 and at a point I that is the pre-stage (N−1)-th span (there is no DCF). When the level of compensation carried out by the DCF 103 is too high, the above conditions are not satisfied. Therefore, compensation is limited. As shown in FIG. 7, a change in dispersion of optical signals from the point I to the point H is Dspan+DDCF. The compensation needs to be larger than the opposite sign of the residual dispersion tolerance −□D, at least. Therefore, the expression (3) becomes the necessary condition.

$$D_{DCF} \geq -D_{span} - \Delta D \quad (3)$$

Figure 8:
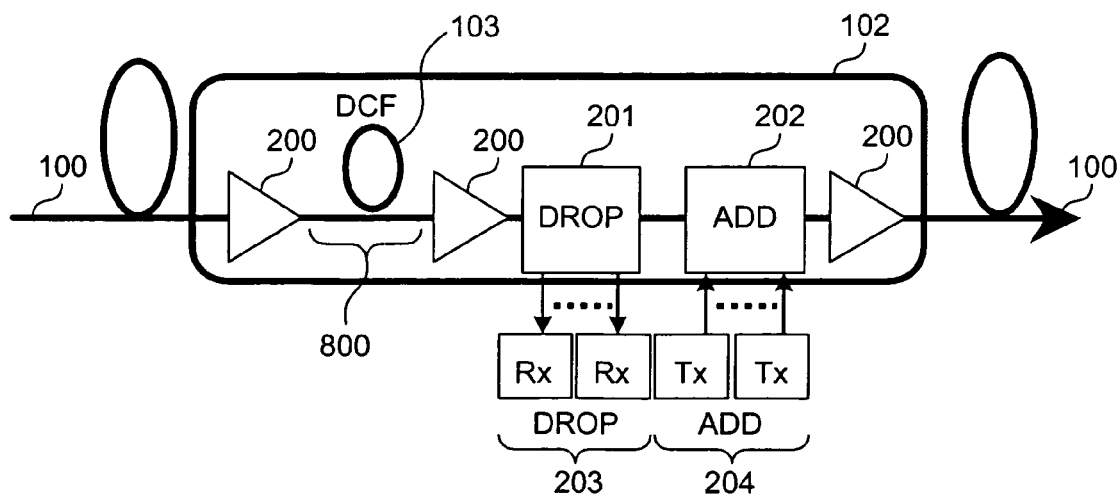
FIG. 8 is an explanatory diagram of permissible dispersion compensation fiber loss of an optical amplifier.

FIG. 8 is an explanatory diagram of permissible dispersion compensation fiber loss of the optical amplifier. The item 3 is explained. As shown in FIG. 8, when the OADM 102 has the DCF 103, when the loss of the DCF becomes too large due to the increase in the dispersion compensation, an optical signal-to-noise ratio becomes smaller. To compensate for excessive loss, many optical amplifiers 200 need to be provided which increases cost, and does not meet the primary objective.

In the 2.4 gigabit optical transmission system, it is most difficult to satisfy the item 1 among the above three items. Therefore, in most cases, the compensation DDCF is limited by the expression (2). However, when the limit of the compensation DDCF is stricter in the expression (3), that is, when the value is smaller, a value limited by the expression (3) is used.

When the number of the DCFs 103 and the compensation DDCF are fixed, the cumulative dispersion during the maximum number of spans from R1 to R2 is set to a value approximate to the maximum value of the residual dispersion tolerance T. Based on this, the total compensation carried out by the DCFs 103 can be minimized. As a result, a span interval of the disposition of the DCFs by minimizing the number of the dispositions of the DCFs is obtained from the expression (1). For example, assume a transmission system of 50 km/span□40 (a maximum number of spans) =2,000 kilometers. In the expression (1), m□13. This m is divided by a maximum number of spans, thereby obtaining a disposition rate of the DCFs 103, as 13/40. Since the DCFs are disposed cyclically, the DCFs 103 do not need to be provided in two spans out of three spans.

Figure 9:
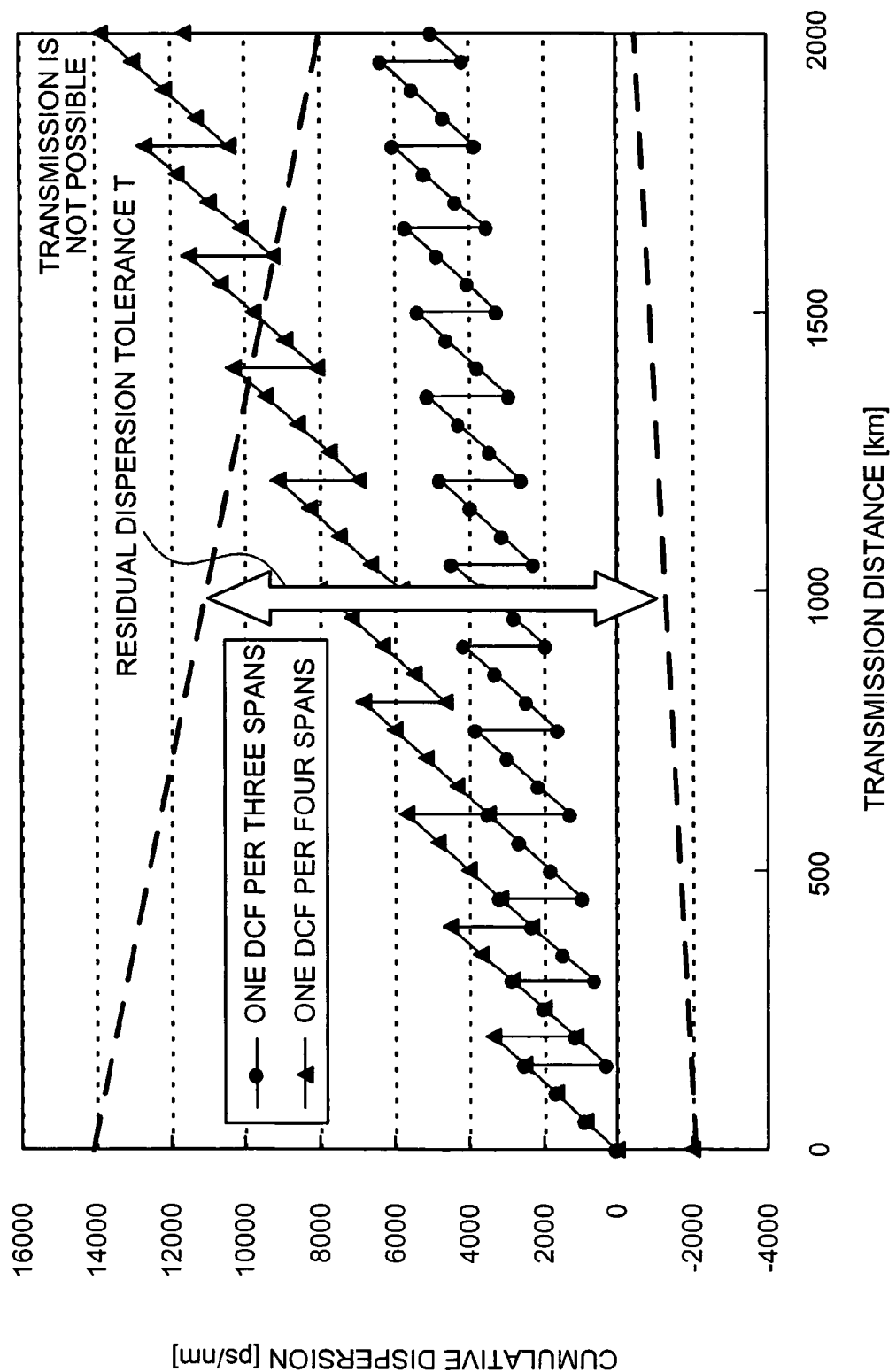
FIG. 9 is a graph of a result of calculating dispersion of optical signals when the DCFs are disposed using a chromatic dispersion compensation method according to the present invention.

FIG. 9 is a graph of a result of calculating dispersion of optical signals when DCFs are disposed using the chromatic dispersion compensation method according to the present invention. In FIG. 9, the vertical axis represents cumulative dispersion [ps/nm], and the horizontal axis represents a transmission distance [kilometers]. Lines connecting between round plots indicate dispositions of the DCFs 103 (one DCF per three spans) calculated based on the chromatic dispersion compensation method according to the present invention. Lines connecting between triangular plots indicate dispositions, with one additional disposition, of the DCFs 103 (one DCF per four spans) calculated based on the chromatic dispersion compensation method according to the present invention.

As is clear with reference to FIG. 9, when one DCF 103 is disposed per three spans, cumulative dispersion of optical signals is within the residual dispersion tolerance T at dropping positions in all nodes, that is, at positions with round plots, up to the maximum transmission distance 2,000 kilometers. Transmission characteristic is secured during this distance. On the other hand, when one DCF 103 is disposed per four spans, cumulative dispersion of optical signals escapes from the residual dispersion tolerance T near the transmission distance 1,600 kilometers. This means that the expression (1) is satisfied when one DCF 103 is disposed per three spans, and the expression (1) is not satisfied when one DCF 103 is disposed per four spans.

Figure 10:
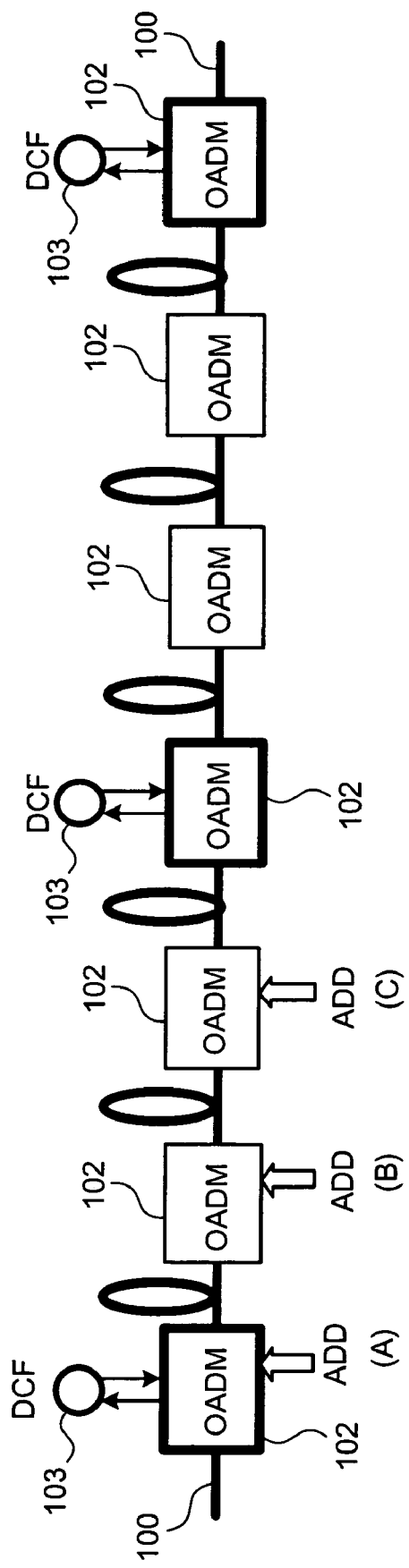
FIG. 10 is an explanatory diagram of an example of add positions of optical signals when the DCFs are disposed using the chromatic dispersion compensation method according to the present invention.

FIG. 10 is an explanatory diagram of an example of add positions of optical signals when DCFs are disposed using the chromatic dispersion compensation method according to the present invention. As shown in FIG. 10, DCFs 103 are disposed in the OADMs 102 provided on the transmission path 100 based on the chromatic dispersion compensation method according to the present invention. Cumulative dispersion of optical signals added at positions (A), (B), and (C) up to the maximum transmission distance 2,000 kilometers in this chromatic dispersion compensation system is calculated.

Figure 11:
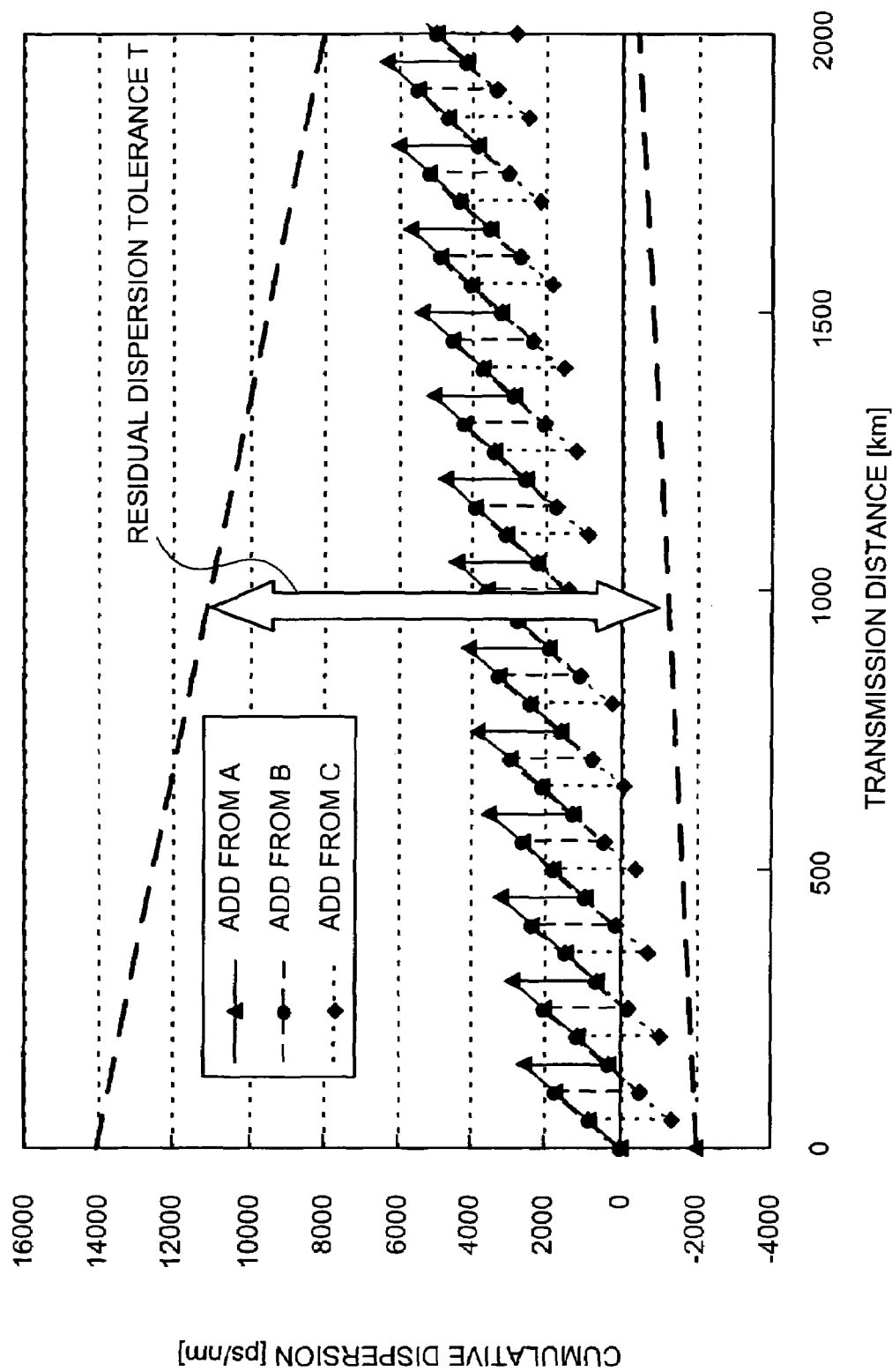
FIG. 11 is a graph of a result of calculating dispersion of optical signals at, for example, add positions shown in FIG. 10.

FIG. 11 is a graph of a result of calculating dispersion of optical signals, for example, at add positions shown in FIG. 10. In FIG. 11, the vertical axis represents cumulative dispersion [ps/nm], and the horizontal axis represents a transmission distance [kilometers].

When the DCFs 103 are disposed cyclically, it is clear from these drawings that a dispersion map is different depending on add positions of optical signals out of the add positions (A), (B), and (C) shown in FIG. 10. Compensation carried out by the DCFs 103 and the number of dispositions are determined by taking the above three limit items into account. Therefore, when optical signals are added at any one of the positions (A) to (C), cumulative dispersion of optical signals is within the residual dispersion tolerance T at drop time, that is, at plotted positions in FIG. 11. As explained above, based on the chromatic dispersion compensation method according to the present invention, optimum compensation and optimum number of disposition of the DCFs 103 can be obtained, from the calculation results shown in FIG. 9 and FIG. 11.

As explained above, according to the OADM and the chromatic dispersion compensation method, a most efficient minimum number of DCFs 103 are disposed so that the cumulative dispersion of optical signals between the REG 101 is accommodated within the residual dispersion tolerance. Therefore, a transmission system can be provided at low cost.

Figure 12:
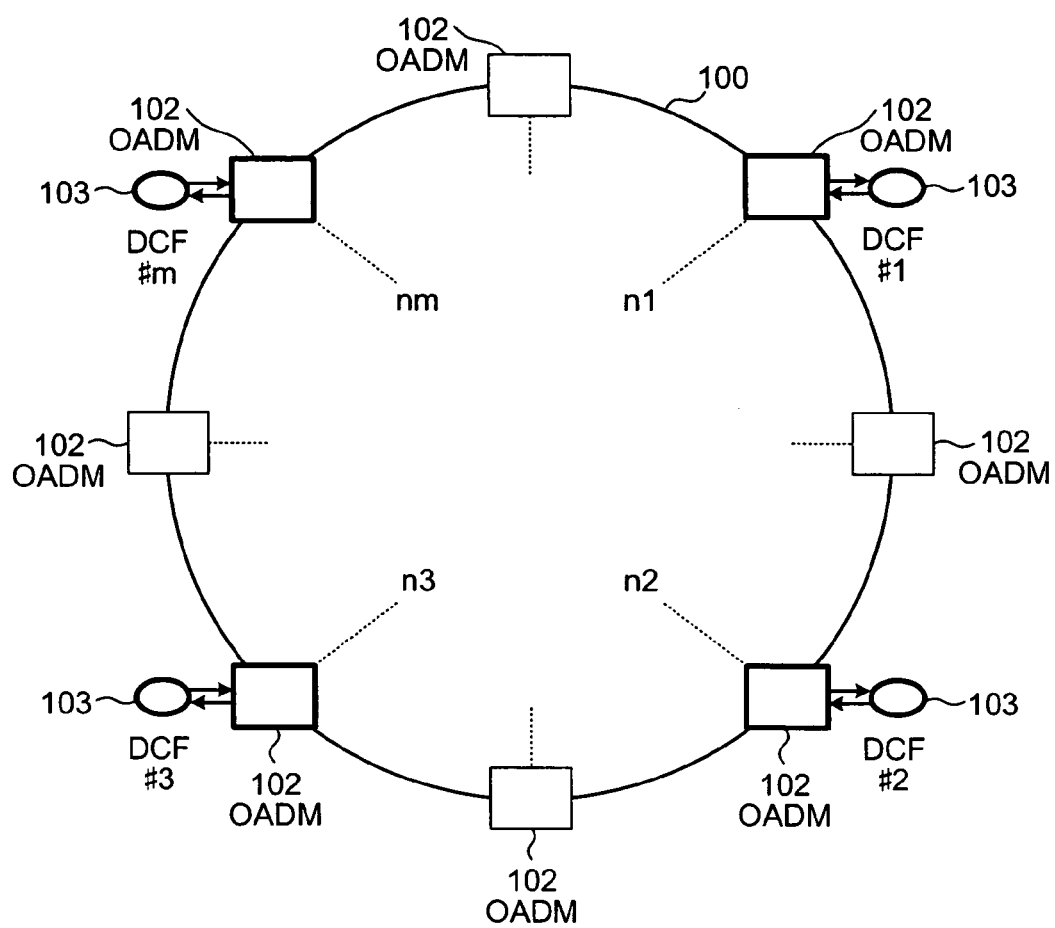
FIG. 12 is an explanatory diagram of another configuration of a chromatic dispersion compensation system according to the present invention.
Figure 13:
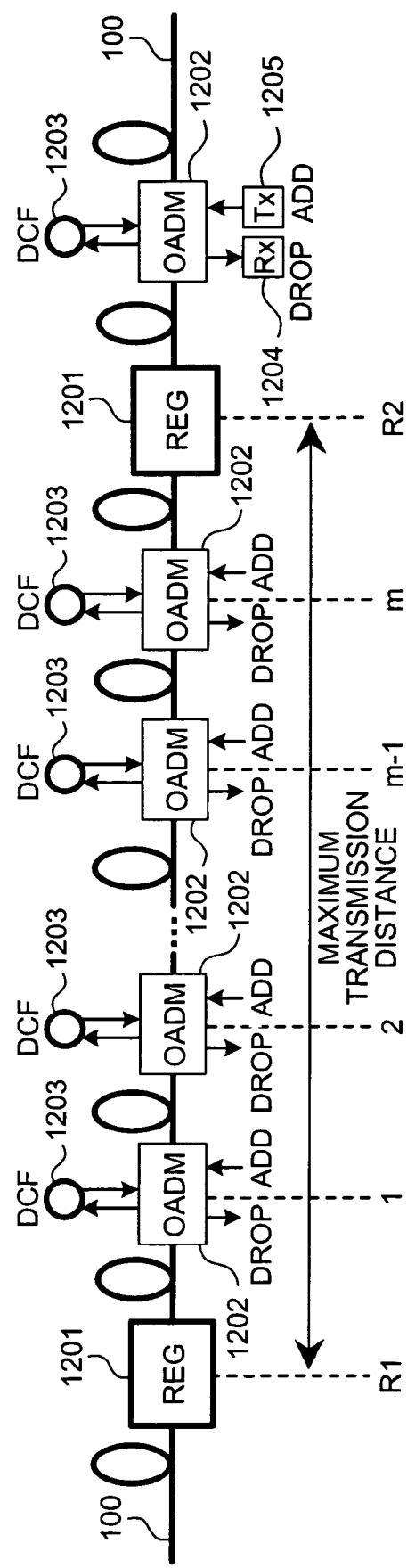
FIG. 13 is an explanatory diagram of a method of compensating for chromatic dispersion in a conventional 10 gigabit optical transmission system.
Figure 14:
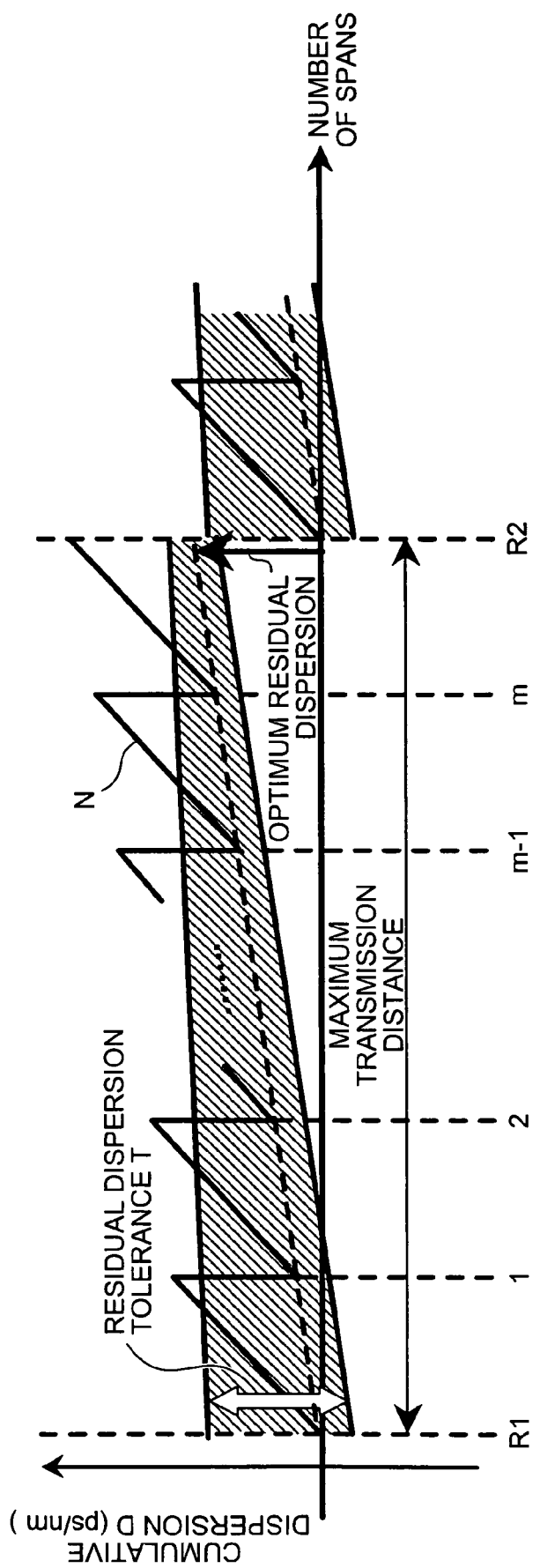
FIG. 14 is a graph of a relationship between dispersion compensation and residual dispersion tolerance in the chromatic dispersion compensation system shown in FIG. 13.
Figure 15:
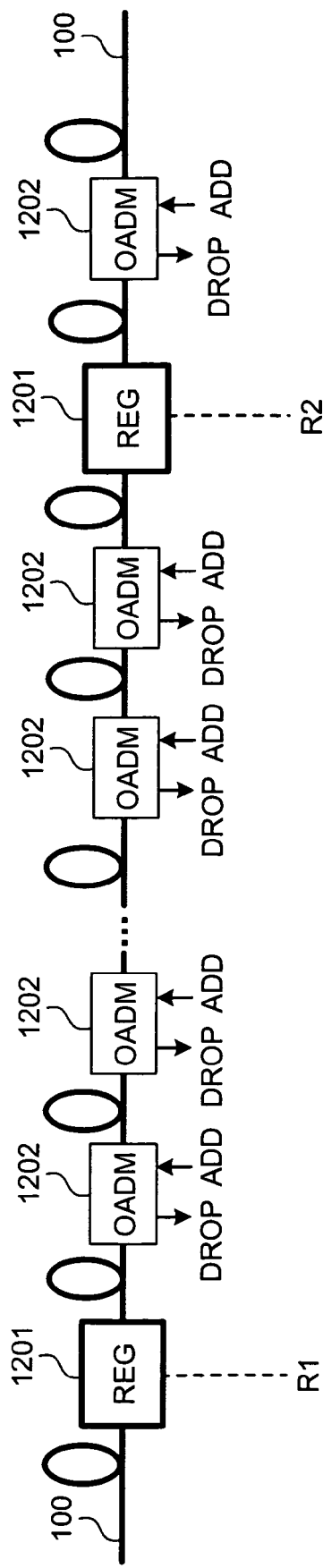
FIG. 15 is an explanatory diagram of a conventional 2.4 gigabit optical transmission system.
Figure 16:
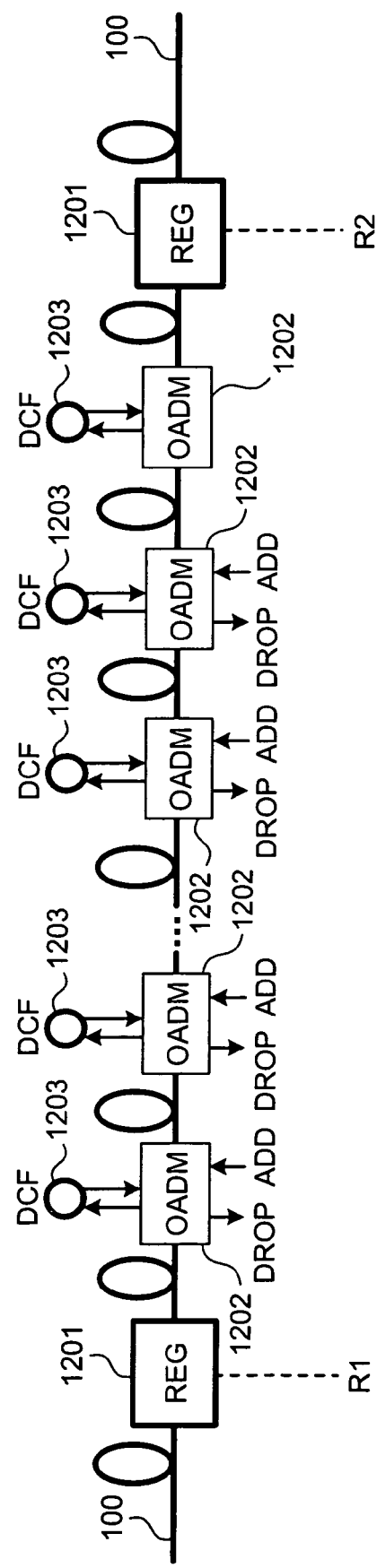
FIG. 16 is an explanatory diagram of a method of compensating for chromatic dispersion in the conventional 2.4 gigabit optical transmission system.
Figure 17:
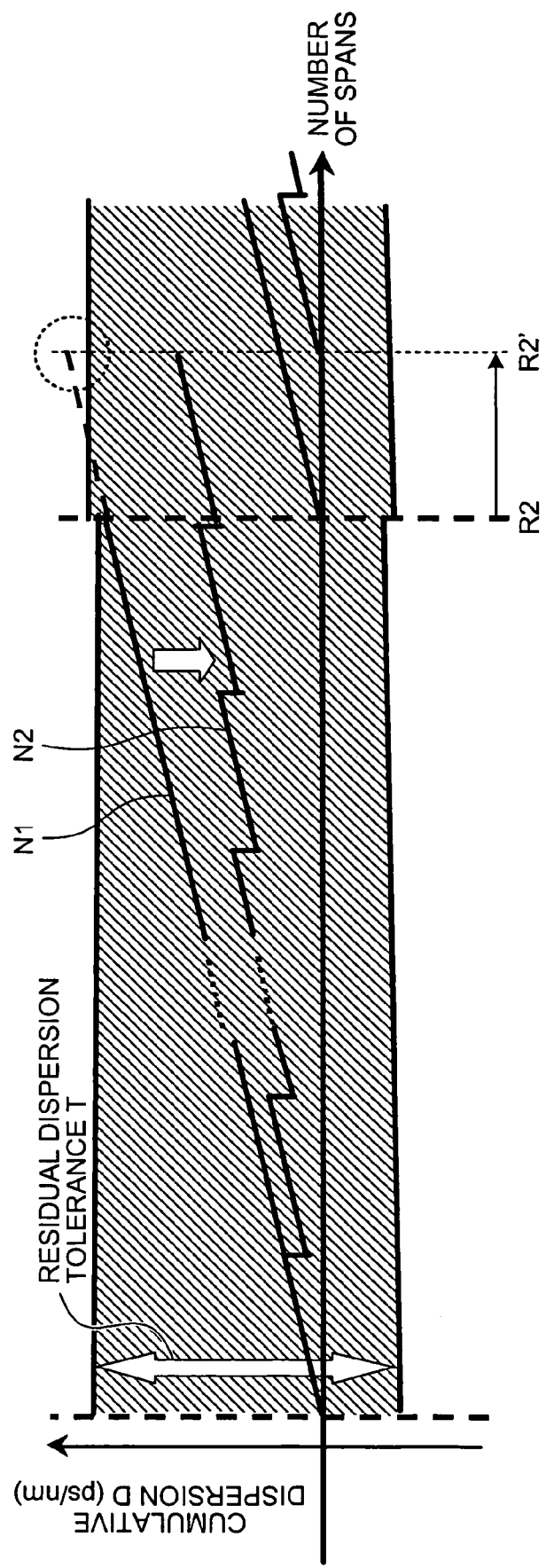
FIG. 17 is a graph of a relationship between dispersion compensation and residual dispersion tolerance in the chromatic dispersion compensation system shown in FIGS. 15 and 16.

While drop and add nodes are disposed among plural REGs in the network for the sake of convenience in the above drawings, there are also networks in which no REG is disposed. For example, in a ring network having no REG as shown in FIG. 12, an optical signal that is added from a certain node does not return to the original position after circulating around the ring. Therefore, a maximum transmission distance becomes (one round length of the ring)–(a minimum span length within the ring). Therefore, when it is considered that add nodes and drop nodes of the optical signal path corresponding to the maximum transmission distance are present at the same positions as those of the REGs, the same dispersion compensation setting method can be applied. In a mesh network having no REGs, a maximum transmission distance is also prescribed. Therefore, nodes at both ends can be regarded as the REGs.

The chromatic dispersion compensation method according to the embodiments can be realized by executing a program, prepared in advance, by using a computer such as personal computer and a workstation. The program is recorded in a computer-readable recording medium such as a hard disk, a flexible disk, a compact disk read only memory (CD-ROM), a magneto optical disk (MO), and a digital versatile disk (DVD), and the program is executed by being read out from the recording medium using the computer. The program may be a transmission medium that can be distributed through a network such as the Internet.

According to the present invention, a minimum necessary number of chromatic dispersion compensators that compensate for chromatic dispersion of optical signals can be disposed in plural nodes. Therefore, the cost of the optical transmission system can be reduced.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical transmission system with a plurality of nodes each of which adds/drops an optical signal to/from a transmission path, wherein:
   the nodes include
      a first node that includes a first dispersion compensator that performs a first dispersion compensation on the optical signal;
      a second node that is arranged downstream of the first node and includes a second dispersion compensator that performs a second dispersion compensation on the optical signal; and
      a third node that is arranged between the first node and the second node and includes no dispersion compensator, and
   an amount of the first dispersion compensation and an amount of the second dispersion compensation are determined so that a cumulative dispersion of the optical signal after the second dispersion compensation is within a predetermined range.

2. The optical transmission system according to claim 1, wherein the amount of the first dispersion compensation and the amount of the second dispersion compensation are determined so that a cumulative dispersion of the optical signal when the optical signal is dropped from the transmission path is within the predetermined range, irrespective of a number of spans for which the optical signal has been transmitted through the optical transmission system.

3. The optical transmission system according to claim 1, wherein a number of third node(s) is determined to maximize a ratio of the third node(s) to the nodes.

4. The optical transmission system according to claim 1, wherein the optical transmission system includes a plurality of sets of the first node, second node, and a predetermined number of third node(s), the sets being serially arranged on the transmission path.

5. The optical transmission system according to claim 1, wherein each of the first dispersion compensator and the second dispersion compensator is a dispersion compensation fiber.

6. An optical add/drop multiplexer (OADM) in an optical transmission system, comprising:
   a dispersion compensator that performs a dispersion compensation on an optical signal from a first optical add/drop multiplexer (OADM) that includes no dispersion compensator and is arranged downstream of a second optical add/drop multiplexer (OADM) with a dispersion compensator, wherein
   an amount of the dispersion compensation is determined so that a cumulative dispersion of the optical signal after the dispersion compensation is within a predetermined range.

7. A dispersion compensation method for an optical add/drop multiplexer (OADM) in an optical transmission system, wherein:
   the OADM includes a dispersion compensator that performs a dispersion compensation on an optical signal from a first optical add/drop multiplexer (OADM) that includes no dispersion compensator and is arranged downstream of a second optical add/drop multiplexer (OADM) with a dispersion compensator, and
   an amount of the dispersion compensation is determined so that a cumulative dispersion of the optical signal after the dispersion compensation is within a predetermined range.

8. The dispersion compensation method according to claim 7, wherein the amount of the dispersion compensation is determined so that a cumulative dispersion of the optical signal when the optical signal is dropped from a transmission path is within the predetermined range, irrespective of a number of spans for which the optical signal has been transmitted through the optical transmission system.

* * * * *